(12) United States Patent
Bjergo et al.

(10) Patent No.: US 6,581,067 B1
(45) Date of Patent: Jun. 17, 2003

(54) METHOD AND SYSTEM FOR PROVIDING ADMINISTRATIVE SUPPORT

(75) Inventors: Reed M. Bjergo, Eagan, MN (US); Michael C. Amarante, Wallingford, CT (US); Mark Schroder, Enfield, CT (US); Yasuhiko Katagiri, Minneapolis, MN (US)

(73) Assignee: Uniprise, Inc., Hartford, CT (US)

( * ) Notice: Subject to any disclaimer, the term of this patent is extended or adjusted under 35 U.S.C. 154(b) by 227 days.

(21) Appl. No.: 09/660,220

(22) Filed: Sep. 12, 2000

(51) Int. Cl.⁷ .................. G06F 17/30; G06F 13/00; G06F 15/16; H04M 11/00; H04M 3/00
(52) U.S. Cl. .................. 707/104; 705/5; 709/245; 709/229; 379/88.14; 379/265.01; 345/329
(58) Field of Search .................. 379/265.01, 88.14, 379/201; 345/329; 395/182.02; 709/229, 245; 707/104.1, 5; 705/5

(56) References Cited

U.S. PATENT DOCUMENTS

| | | | |
|---|---|---|---|
| 5,640,505 A | * 6/1997 | Hearn et al. | 395/182.02 |
| 5,737,726 A | 4/1998 | Cameron et al. | |
| 5,774,887 A | 6/1998 | Wolff et al. | |
| 5,884,157 A | 3/1999 | Karmi | |
| 5,895,466 A | * 4/1999 | Goldberg et al. | 707/5 |
| 5,915,008 A | * 6/1999 | Dulman | 379/201 |
| 5,953,055 A | 9/1999 | Huang et al. | |
| 5,987,116 A | * 11/1999 | Petrunka et al. | 379/265 |
| 5,995,948 A | 11/1999 | Whitford et al. | |
| 6,032,184 A | 2/2000 | Cogger et al. | |
| 6,049,602 A | 4/2000 | Foladare et al. | |
| 6,177,932 B1 | * 1/2001 | Galdes et al. | 345/329 |
| 6,327,363 B1 | * 12/2001 | Henderson et al. | 379/265.01 |
| 6,363,430 B1 | * 3/2002 | Thomas | 709/245 |
| 6,411,684 B1 | * 6/2002 | Cohn et al. | 379/88.14 |
| 6,434,619 B1 | * 8/2002 | Lim et al. | 709/229 |

FOREIGN PATENT DOCUMENTS

| | | | |
|---|---|---|---|
| EP | 0 802 664 A2 | * 10/1997 | H04M/3/50 |
| EP | 0 954 155 A2 | * 11/1999 | H04M/3/50 |

* cited by examiner

*Primary Examiner*—Frantz Coby
(74) *Attorney, Agent, or Firm*—Cantor Colburn LLP

(57) ABSTRACT

An exemplary embodiment of the invention is an administrative support system which provides customer support representatives the ability to respond to customer requests efficiently. The system includes a plurality of customer service workstations coupled to a host system through a network. The host system is coupled to a database and one or more legacy systems. A customer service representative at the customer service workstation can perform tasks such as searching provider information, updating eligibility and enrollment information and creating and tracking call records.

13 Claims, 9 Drawing Sheets

PROVIDER SEARCH FACILITY

Name: WILLIAM R. POWELL    MPIN: 001316967

Patient Age Range: 000-999 (years)    Add'l Languages: None Listed

Specialties: Cardiothoracic Surgery

Addresses | Contracts | Affiliations
30          32          34

| | Affiliated Provider Name | MPIN |
|---|---|---|
| 🔑 | EAST TEXAS MEDICAL CENTER HOSP | 000390745 |

| | Call History—Search by SSN/Policy—Microsoft Internet Explorer | | | | |
|---|---|---|---|---|---|

Call History Inquiry Results
Click on Event's Magnifying Glass below to visit its SGW1 detail.
Place your mouse over the abbreviated comments shown to see the full comment block.

| | Date | Rep | Contract | SSN | Comments |
|---|---|---|---|---|---|
| 🔍 | 8/3/00 | MSCHRODE | 01G2291 | 429157915 | DEMO OF PASS... |
| 🔍 | 8/1/00 | MSCHRODE | 01G2291 | 429157915 | (N/A) |
| 🔍 | 6/27/00 | SKNEZ | 01G2291 | 429157915 | EE,EFF 6/1/9... |
| 🔍 | 6/22/00 | MSCHRODE | 01G2291 | 429157915 | TEST |
| 🔍 | 6/22/00 | MSCHRODE | 01G2291 | 429157915 | TEST |
| 🔍 | 6/22/00 | MSCHRODE | 01G2291 | 429157915 | TEST |
| 🔍 | 6/22/00 | MSCHRODE | 01G2291 | 429157915 | TEST |

[Cancel]

*FIG. 6*

METHOD AND SYSTEM FOR PROVIDING ADMINISTRATIVE SUPPORT

BACKGROUND OF THE INVENTION

The invention relates generally to a method and system for supporting administrative personnel and in particular to a system and method for providing customer service representatives with customer service workstations to facilitate customer service tasks. Customer service representatives often need to provide immediate response to customers requesting information. Often, the task of obtaining such information is labor intense and slow. Customer service representatives may have to access information through physical means (e.g., reference materials such as directories) or interface electronically with one or more dedicated systems that provide limited information. If a customer service representative must retrieve information from multiple sources, this leads in increased time in responding to the customer's request and frustration of the customer.

BRIEF SUMMARY OF THE INVENTION

An exemplary embodiment of the invention is an administrative support system which provides customer support representatives the ability to respond to customer requests efficiently. The system includes a plurality of customer service workstations coupled to a host system through a network. The host system is coupled to a database and one or more legacy systems. A customer service representative at the customer service workstation can perform tasks such as searching provider information, updating eligibility and enrollment information and creating and tracking call records.

BRIEF DESCRIPTION OF THE DRAWINGS

FIG. 3 is an exemplary provider search result screen presented at a customer service workstation.

FIG. 5 is an exemplary call type selection screen presented at a customer service workstation.

FIG. 6 is an exemplary call history selection screen presented at a customer service workstation.

DETAILED DESCRIPTION OF THE PREFERRED EMBODIMENT

Figure 1:
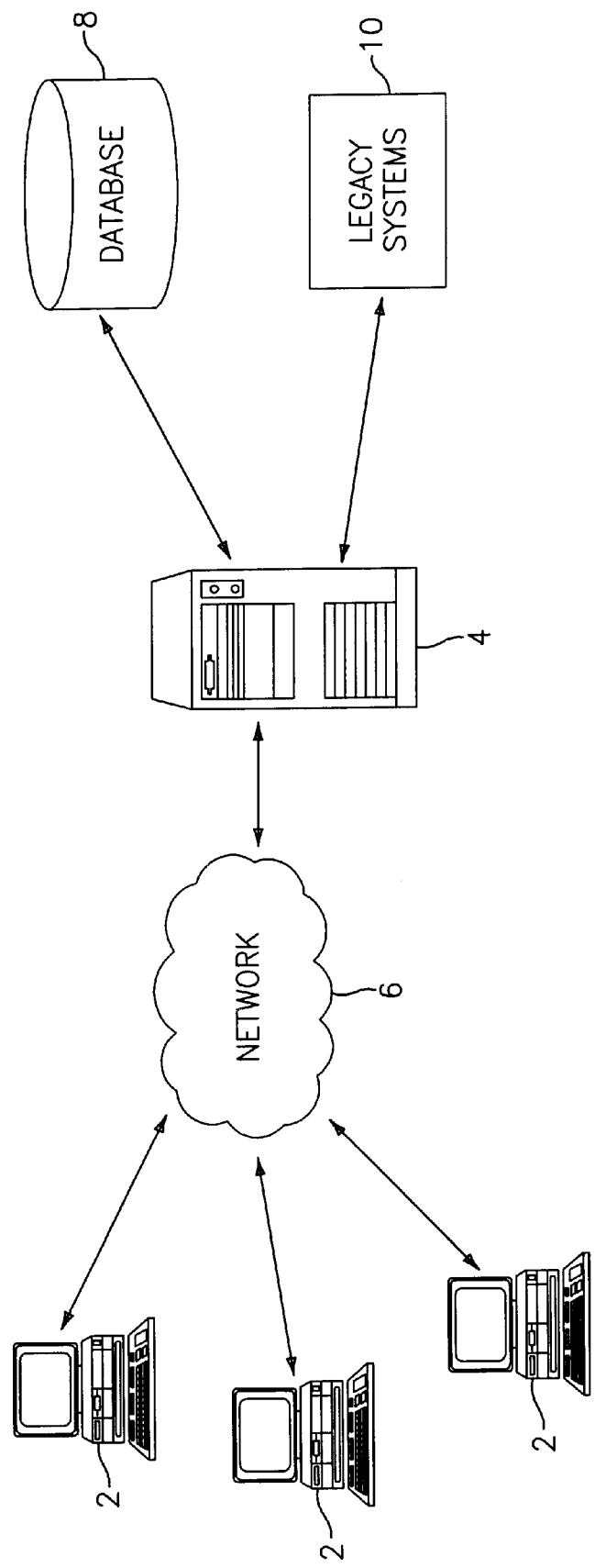
FIG. 1 is a block diagram of an administrative support system in an exemplary embodiment of the invention.

FIG. 1 is a block diagram of an administrative support system in one embodiment of the invention. The system includes one or more customer service workstations 2 coupled to a host system 4 via a network 6. Each customer service workstations 2 may be implemented using a general-purpose computer executing a computer program for carrying out the processes described herein. The network 6 may be any type of known network including a local area network (LAN), wide area network (WAN), global network (e.g., Internet), intranet, etc. The customer service workstations 2 may be coupled to the host system 4 through multiple networks (e.g., intranet and Internet) so that not all customer service workstations 2 are coupled to the host system 4 via the same network. One or both of the customer service workstations 2 and the host system 4 may be connected to the network 6 in a wireless fashion and network 6 may be a wireless network. In a preferred embodiment, the network 6 is a LAN and each customer service workstation 2 executes a user interface application (e.g., web browser) to contact the host system 4 through the network 6. Alternatively, a customer service workstation 2 may be implemented using a device programmed primarily for accessing network 6 such as WebTV.

The host system 4 may be implemented using a server operating in response to a computer program stored in a storage medium accessible by the server. The host system 4 may operate as a network server (often referred to as a web server) to communicate with the customer service workstations 2. The host system 4 handles sending and receiving information to and from customer service workstations 2 and can perform associated tasks. The host system 4 may also includes a firewall to prevent unauthorized access to the host system 4 enforce any limitations on authorized access. For instance, an administrator may have access to the entire system and have authority to modify portions of the system. The firewall 41 may be implemented using conventional hardware and/or software as is known in the art.

The host system 4 also operates as an applications server. The host system 4 executes one or more computer programs to interact with a database 8 and legacy systems 10. It is understood that separate servers may be used to implement the network server functions and the applications server functions. Alternatively, the network server, firewall and the applications server can be implemented by a single server executing computer programs to perform the requisite functions.

Database 8 contains a variety of information related to the entity operating the system. In an exemplary embodiment, the system is operated by an insurance provider. Changes to database 8 can be made dynamically, in real time to instantaneously update information accessible by customer service workstations 2. This helps ensure that items such as mandated benefit changes, new products and state regulations are kept current. Database 8 allows information to be updated on-line, in real-time for staff to properly administer accounts and provide enhanced service to requesters.

The host system 4 interacts with legacy systems 10 to extract a variety of information from multiple legacy systems 10 in a user-friendly manner. In prior systems, each legacy system would be a separate computer system (e.g., a mainframe) requiring specific software and commands for access. The use of customer service workstations 2 in communication with host system 4 eliminates the need for multiple, dedicated user interfaces to legacy systems 10. All access is performed through the host system 4. Exemplary legacy systems 10 include a system for benefits, eligibility, rating and provider information; a system for billing information; a system for claims information; and a system for provider information. By providing a single interface to numerous legacy systems, users of the customer service workstations 2 are more easily trained than if the user had to learn different techniques for accessing each legacy system.

Operation of the system will now be described. In an embodiment of the invention, the system is utilized by an insurance company to provide enhanced customer service to those requesting assistance. Typically, a requestor (e.g., a member in an insurance program, a provider of services under the program, etc.) contacts a customer service representative through known communications techniques (e.g., telephone, e-mail). The customer service workstations 2 are operated by customer service representatives and facilitate assisting requestors.

One task executed through the customer service workstation 2 is processing member eligibility changes and enrollments. Often members of an insurance plan contact the insurance provider to request a change in eligibility and enrollment. A customer service representative operating a customer service workstation 2 can perform numerous tasks across multiple legacy systems 10 through a single interface. Such tasks include: adding, terminating and making employee name, gender, date of birth and eligibility changes; adding, terminating and making dependent name, gender, date of birth and eligibility changes; updating employer and employee addresses; updating specific remarks, including missing information on an employee application that was sent in for enrollment processing; ordering member medical ID cards; searching and testing for availability of benefits for a policyholder; and processing a new enrollment.

The customer service workstation 2 also provides for accessing and updating free-form comments on contracts for information such as ordering/status of fulfillment materials, group and member level changes, and special handling. Certain actions, referred to as special handling, may fall, outside normal administrative procedures. For such actions, it may not be entirely clear why a customer service representative performed the action. The customer service workstation 2 allows the customer service representative to also add free form text comments to certain actions to provide clarification of an action.

As noted above, enrollment and eligibility information can be updated through the customer service workstation 2. The process involves a member contacting a customer service representative to request an update to eligibility information. The customer service representative submits a request through the customer service workstation 2 to the host system 4 to update eligibility information. The host system 4 accesses database 8 and updates eligibility information as requested. Updates to enrollment information are handled in the same manner.

Effective processing of enrollment and eligibility changes may require access to enrollment and eligibility guidelines. The database 8 may store member and dependent enrollment and eligibility guidelines, for the State of issue of the group, in an easy-to-use text format, as applicable to the group or member being serviced. This information is accessible through the customer service workstation 2 to aid in responding to requestor inquiries. The availability of such enrollment and eligibility information is helpful given the frequency of changes of State insurance laws and State-to-State variations in regulations.

Another task executed through the customer service workstation 2 is a searching for providers. The customer service representative searches for providers in a member's network and add or change Primary Care Physician (PCP) assignments for the member and dependents. A user-friendly search tool in provided to the customer service workstation 2 allows for a quick and easy search for network providers to assist members. Data concerning providers and member is stored in database 8. A number of different fields are used to arrange the data and searches can be conducted based on one or more fields in a Boolean fashion. The various fields are described herein.

A market number field is a numeric identifier (e.g., 5 digit) for the provider network that applies to the employer's location and plan of benefits. In an exemplary embodiment, the market number is made up of a 2-digit state code plus a 3-digit network code. A market type field is used to differentiate among product-specific networks within a market. A product type field defines the type of managed care product that the provider is contracted for. It is also the same product type that the employee/member is receiving benefits from.

Figure 2:
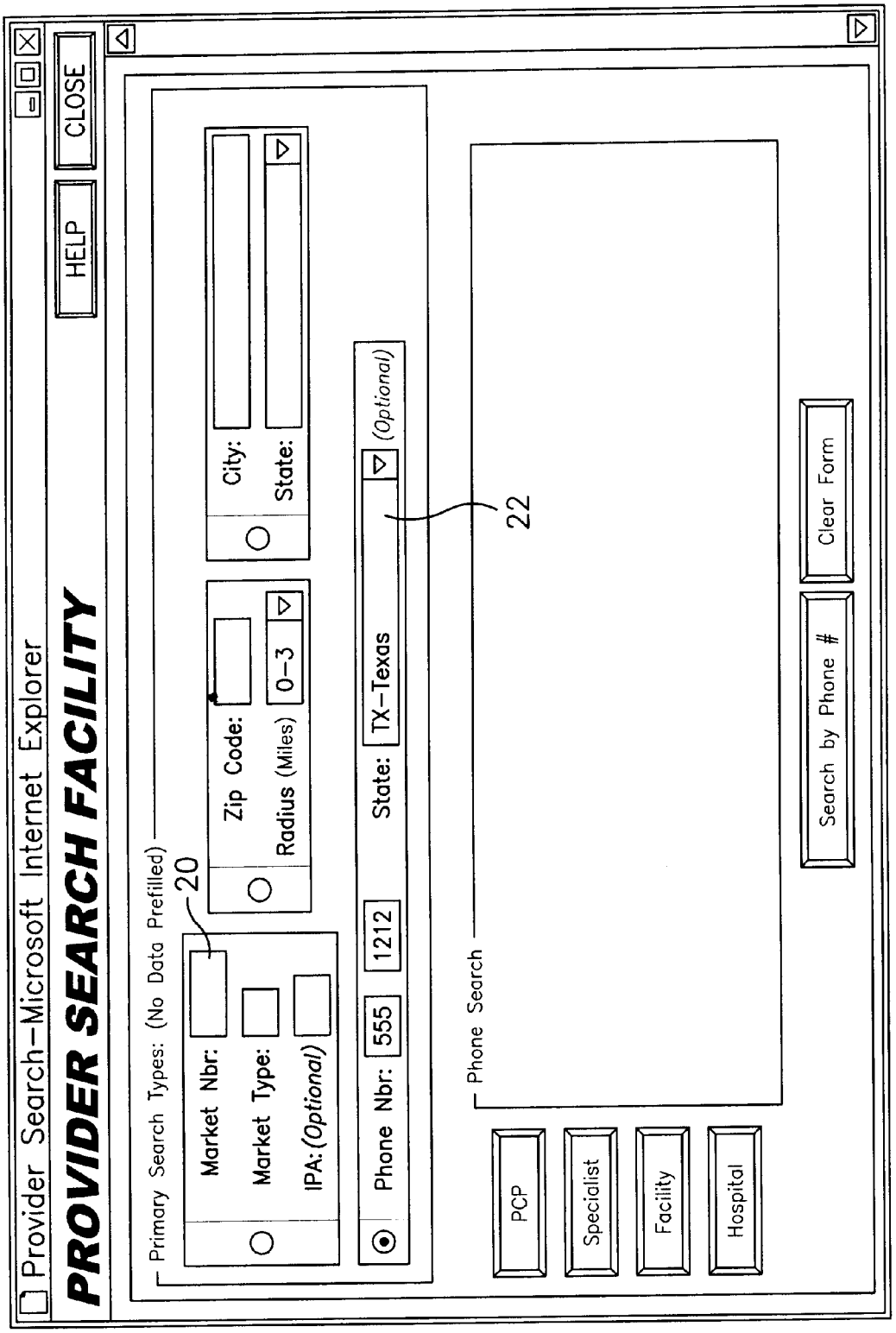
FIG. 2 is an exemplary provider search screen presented at a customer service workstation.

A tax identification number field contains the tax ID of the provider. A suffix field is used to differentiate providers when more than one provider uses the same tax ID. A last name/business name field contains the last name or business name of the provider. A first initial field contains the provider's first initial. A specialty field contains a specialty code (e.g., two digit code) of the provider. An individual practice association field contains an individual practice association code (e.g., a three digit code) of the physician group that the provider is affiliated with. A telephone number field contains the telephone number of the provider and an identification code field contains an identification code (e.g., nine digits) assigned to the provider by owner of the system. FIG. 2 depicts an exemplary user interface provided to the customer service workstation 2 for performing the provider search. The provider search interface shown in FIG. 2 includes a number of dialog boxes 20 or drop down menus 22 to allow the customer service representative to enter a search term for the fields described above.

Once the customer service workstation provides the search terms to the host system 4, the host system 4 accesses database 8 and retrieves provider records based on the search terms. The host system 4 provides the results to the customer service workstation 2. The results may include general information about a provider (i.e., name, address, phone numbers, Tax ID/SSN, specialties, office hours). The results may also include a provider's current and historical contract/network affiliations, a provider's current and historical provider affiliations (i.e. hospitals) and a provider's current and historical credentials (i.e. education/training, board certification status). FIG. 3 depicts an exemplary search result screen in which the customer service representative can obtain information about the provider by selecting tabs 30, 32 or 34 to view information concerning the provider.

Figure 4:
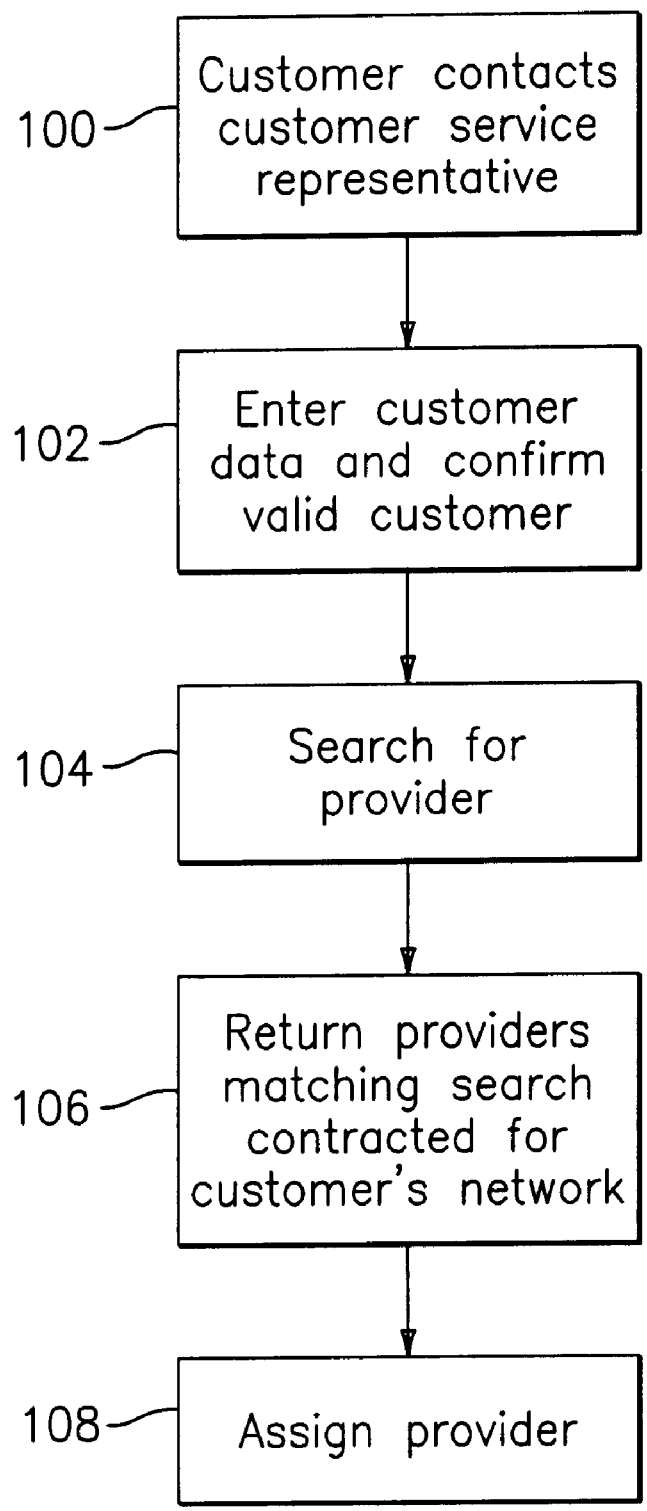
FIG. 4 is a flow chart of an exemplary process for searching provider information.

The system of FIG. 1 also provides the ability to assign a provider as a PCP for a customer. The process of assigning a provider to a customer is shown in FIG. 4. The process begins at step 100 where a customer contacts a customer service representative (e.g., by telephone). At step 102, customer data (e.g., customer's social security number, plan number, etc.) is entered through the customer service workstation 2 and the customer service representative verifies that the customer exists and is participating in a managed care plan and has a primary care physician assigned to him/her. At step 104, the customer service representative enters search criteria for a provider based on input from the customer. The customer may have a name of a provider and desire confirmation that the provider is available as a PCP. Alternatively, the customer may request a search for a PCP. At step 104, the search is performed by host system 4 and providers matching the search criteria and contracted in the customer's network are identified. The results are returned to the customer service workstation 4 at step 106. General information for the provider is provided by the host system 4 to the customer service workstation 2 and the customer service representative can provide such information to the customer. If requested by the customer, the customer service representative assigns a provider to the customer as a PCP at step 108 by selecting an assign button at the customer service workstation 2. The provider is automatically assigned as the PCP for the customer and the database 8 is updated by host system 4.

Another task executed through the customer service workstation 2 is the tracking of calls and issue resolution. Customer service representatives receive calls from requestors (e.g., members, providers, agents,. etc.) needing assistance. The customer service representative creates a record for the call through the customer service workstation 2. The customer service representative inputs information such as the type of caller (member, agent, provider, etc.), caller name, member social security number and/or policy number. The host system 4 populates fields in the call record such as plan type (HMO, PPO) based on information previously stored in database 8. The customer service workstation 2 is presented with information relevant to the requestor to aid in handling the request for assistance.

When the call is complete, the customer service representative identifies the type of call. The customer service workstation 2 is presented with a call type designation interface such as that shown in FIG. 5. The customer service representative selects from a plurality of different predefined call type designators. Multiple selections may be made, depending on the extent of the conversation. The customer service representative may also enter free form text in a dialog window associated with the call record. The free form text allows the customer service representative to describe conditions that are not reflected in the predefined call type designators. The call record, including the call type designator and the comments, is stored in database 8 by host system 4.

Figure 7:
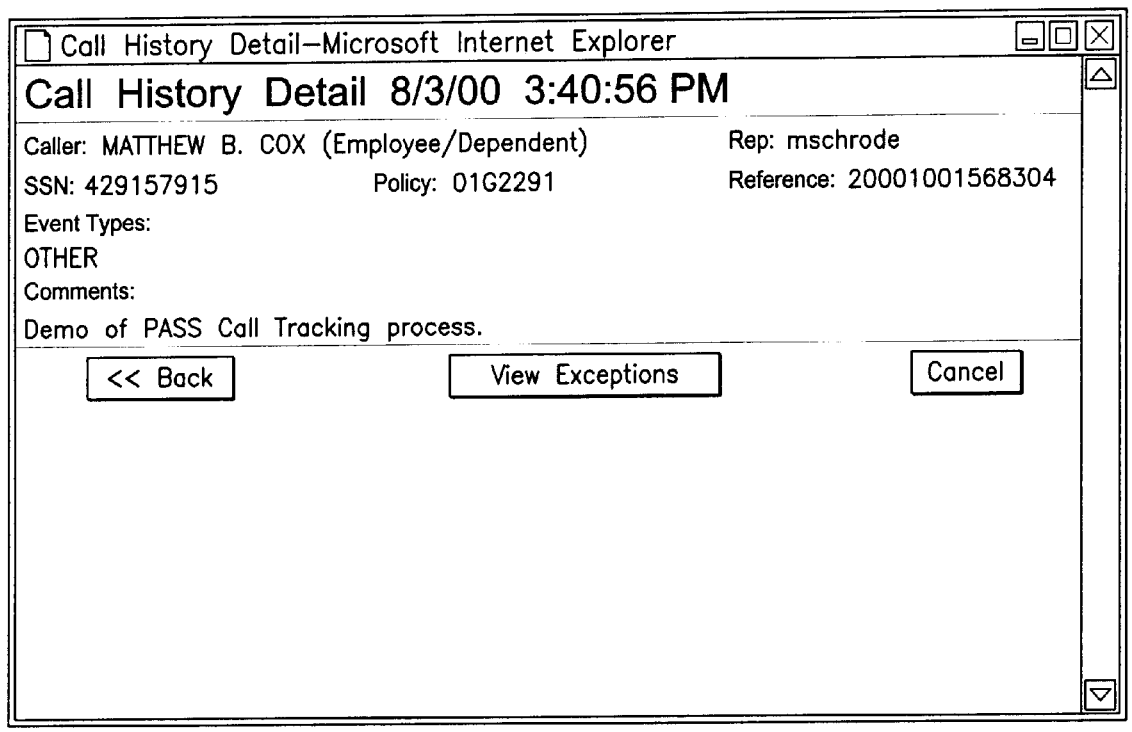
FIG. 7 is an exemplary call record screen presented at a customer service workstation.

Call records can be accessed from customer service workstation 2 through the host system 4 and database 8. Having the call records readily available to the customer service representatives through the customer service workstations 2 enables a higher level of service to requesters. A customer service representative can retrieve a call record by entering call record information (e.g., previously generated reference number, social security number of the requestor, etc.) to recall detailed call history on a specific member or group. FIG. 6 depicts an exemplary list of call records retrieved based on a contract designator entered at a customer service workstation 2. The host system 4 receives the request from the customer service workstation 2 and accesses database 8 to provide the list of call records to the customer service workstation 2. The customer service representative at customer service workstation 2 can then retrieve detailed information for each call record by selecting (e.g., through an input device such as a mouse) one of the call records in FIG. 6. Upon selection of a call record, the host system 4 provides a call record such as that shown in FIG. 7 to the customer service workstation 2. This is useful in escalated service situations, confirming previously discussed information, and allows for improved service to requesters.

Figure 5:
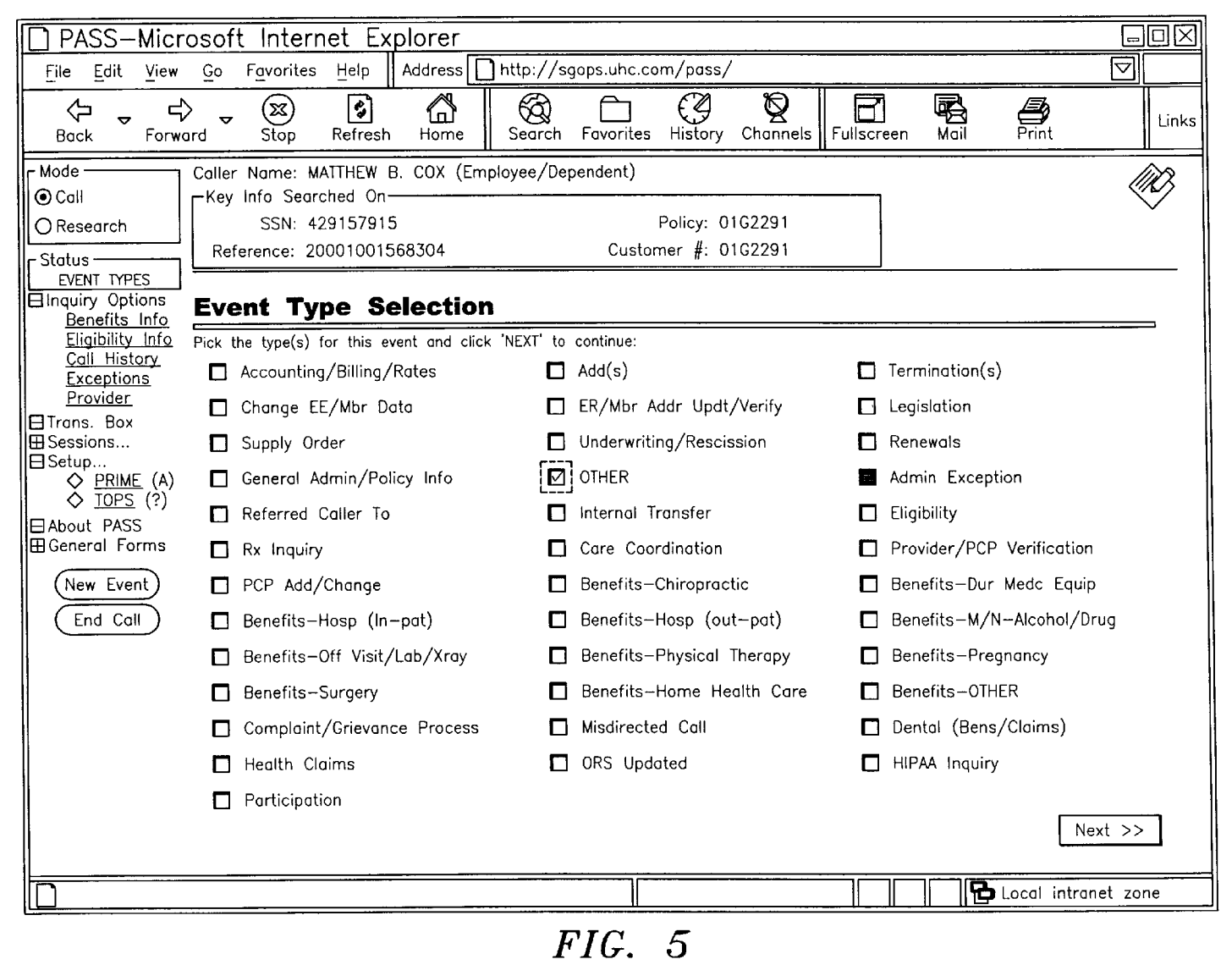

The storage of call records in database 8 allows the system to track call records and generate reports indicative of call activity. Call record reports may be generated based on a number factors including service representative (e.g., all calls received by an individual customer service representative), call type (e.g., calls reported based on the call type designation as depicted in FIG. 5), plan type (e.g., HMP, HMO, PPO, etc.), call resolution (e.g., whether the call was resolved on first contact, whether follow-up was needed, etc) and whether the legacy system 10 has been affected (e.g., report of calls in which data was stored to legacy system 10).

Figure 8:
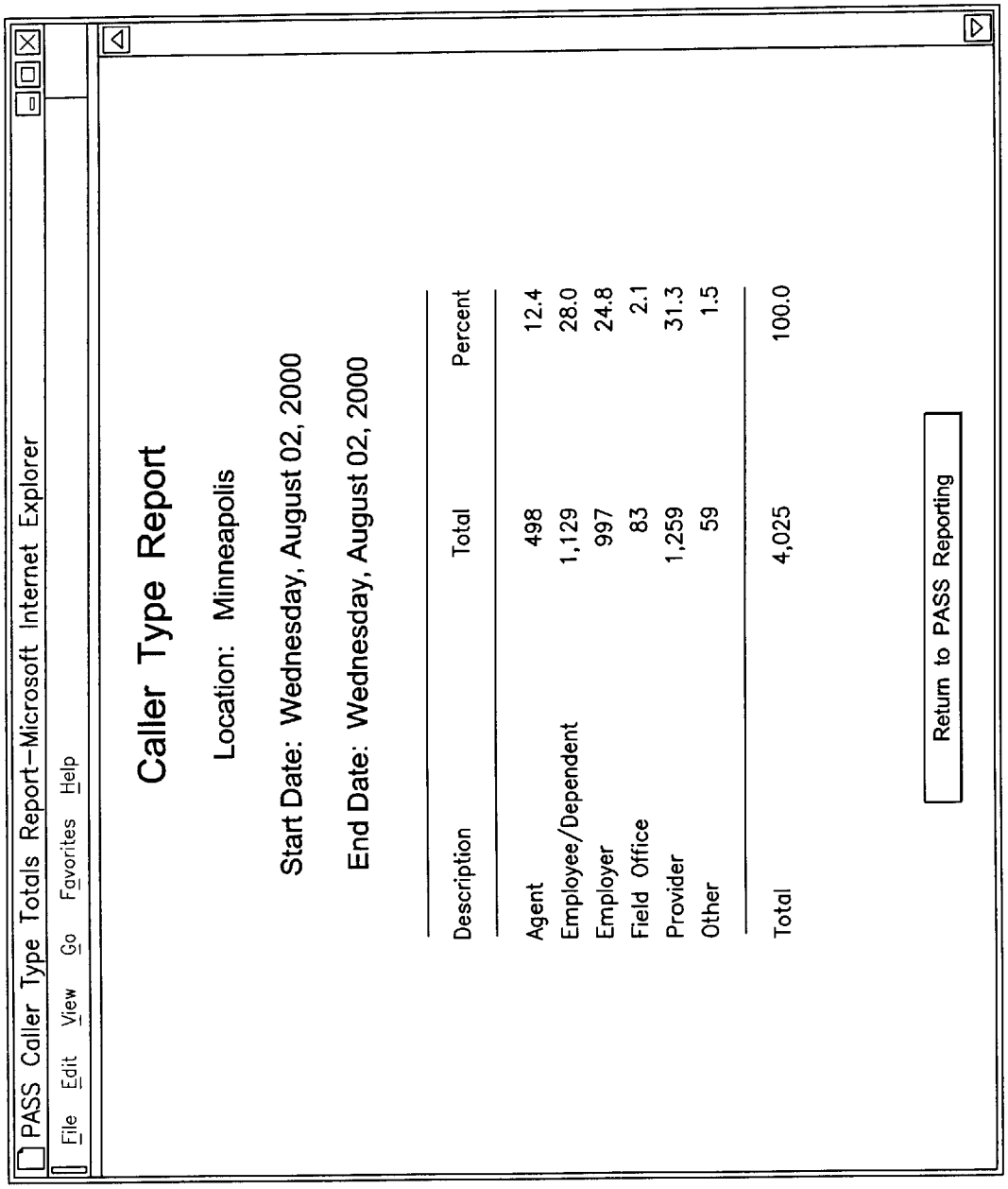
FIG. 8 is an exemplary call report screen presented at a customer service workstation.
Figure 9:
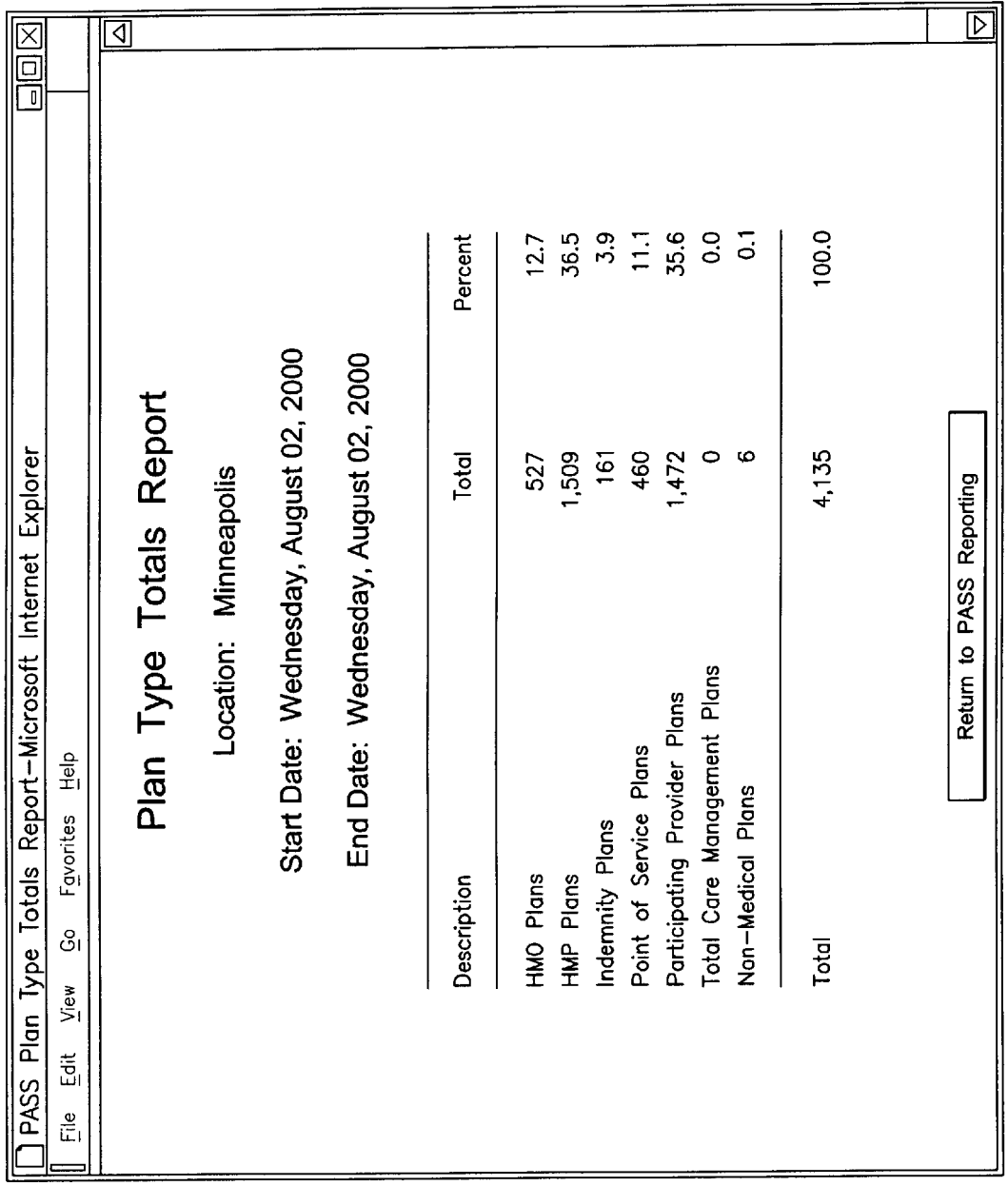
FIG. 9 is an exemplary call report screen presented at a customer service workstation.

FIG. 8 depicts an exemplary report of call activity segmented based on caller type. The report may be accessed from the customer service workstation 2 by submitting a request to the host system 4 over network 6. Alternatively, the host system 4 may execute a program to automatically, periodically generate reports. The automatically generated reports may be distributed through known techniques such as e-mail. As shown in FIG. 8, the report indicates the number and percentage of calls received for a plurality of different caller types. FIG. 9 depicts a report of call activity segmented by plan type. The report may be generated as described above and indicates the number and percentage of calls received for a plurality of different plan types.

As described above, the present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer (such as host system 4), or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the a invention not be limited to the particular embodiments disclosed for carrying out this invention, but that the invention will include all embodiments falling within the scope of the appended claims.

What is claimed is:

1. A system for providing administrative support to customer service representatives, the system comprising:

a customer service workstation;

a host system coupled to said customer service workstation through a network;

a database coupled to the host system; and a legacy system coupled to the host system;

wherein a customer service representative at said customer service workstation receives a call from a requestor;

said customer service representative generates a call record based on said call, said call record includes a call type designator identifying a topic of said call, at least one call type designator identifying a topic of said call from the requestor as insurance benefits, said call record includes comments entered by the customer service representative through said customer service workstation;

said host system stores said call record in said database;

said host system searches said database for call records having a specific call type designator; and said host system generates a call report of call records including said specific call type designator.

2. The system of claim 1 wherein:

said host system generates said report in response to a request from said customer service workstation.

3. The system of claim 1 wherein:

said host system generates said report automatically.

4. The system of claim 1 wherein:

said host system includes a network server for communicating with said customer service workstation.

5. The system of claim 1 wherein:

said host system includes an applications server for communicating with said database.

6. The system of claim 1 wherein:

said customer service workstation submits a request to said host system to update member eligibility information; and said host accesses said database and stores updated member eligibility information.

7. The system of claim 6 wherein:

said customer service workstation submits a request to said host system to update member enrollment information; and said host accesses said database and stores updated member enrollment information.

8. The system of claim 1 wherein:

said customer service workstation submits a request to said host system to obtain provider information; and said host accesses said database and locates provider information.

9. The system of claim 8 wherein:

said host system provides said provider information to said customer service workstation.

10. The system of claim 9 wherein:

said provider information includes provider address.

11. The system of claim 9 wherein:

said provider information includes provider contracts.

12. The system of claim 9 wherein:

said provider information includes provider affiliation.

13. A system for providing administrative support to customer service representatives, the system comprising:

a customer service workstation;

a host system coupled to said customer service workstation through a network;

a database coupled to the host system; and a legacy system coupled to the host system, said legacy system including an insurance benefits and eligibility system, an insurance billing system; an insurance claims information system and an insurance provider information system;

wherein a customer service representative at said customer service workstation receives a call from a requestor, said customer service workstation accessing at least one of said insurance benefits and eligibility system, insurance billing system, insurance claims information system and insurance provider information system in response to said call;

said customer service representative generates a call record based on said call; and said host system stores said call record in said database.

* * * * *